Figure 1:
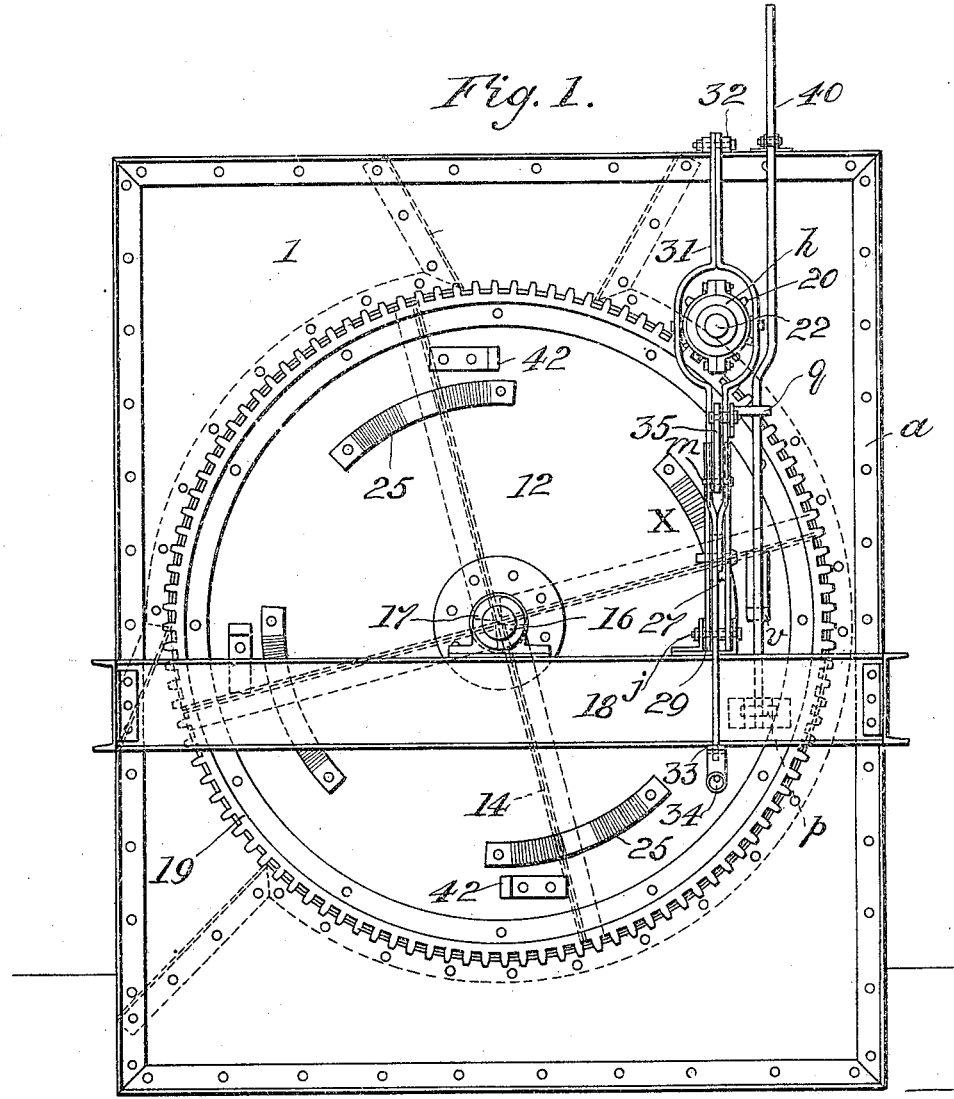

F. P. RENNEBURG.
APPARATUS FOR MEASURING FISH.
APPLICATION FILED JULY 15, 1909.

953,436.

Patented Mar. 29, 1910.
3 SHEETS—SHEET 1.

Witnesses:
Alberta Richards
Thos. P. Mackenzie

Inventor
Frederick P. Renneburg,
by W. T. Howard,
Atty.

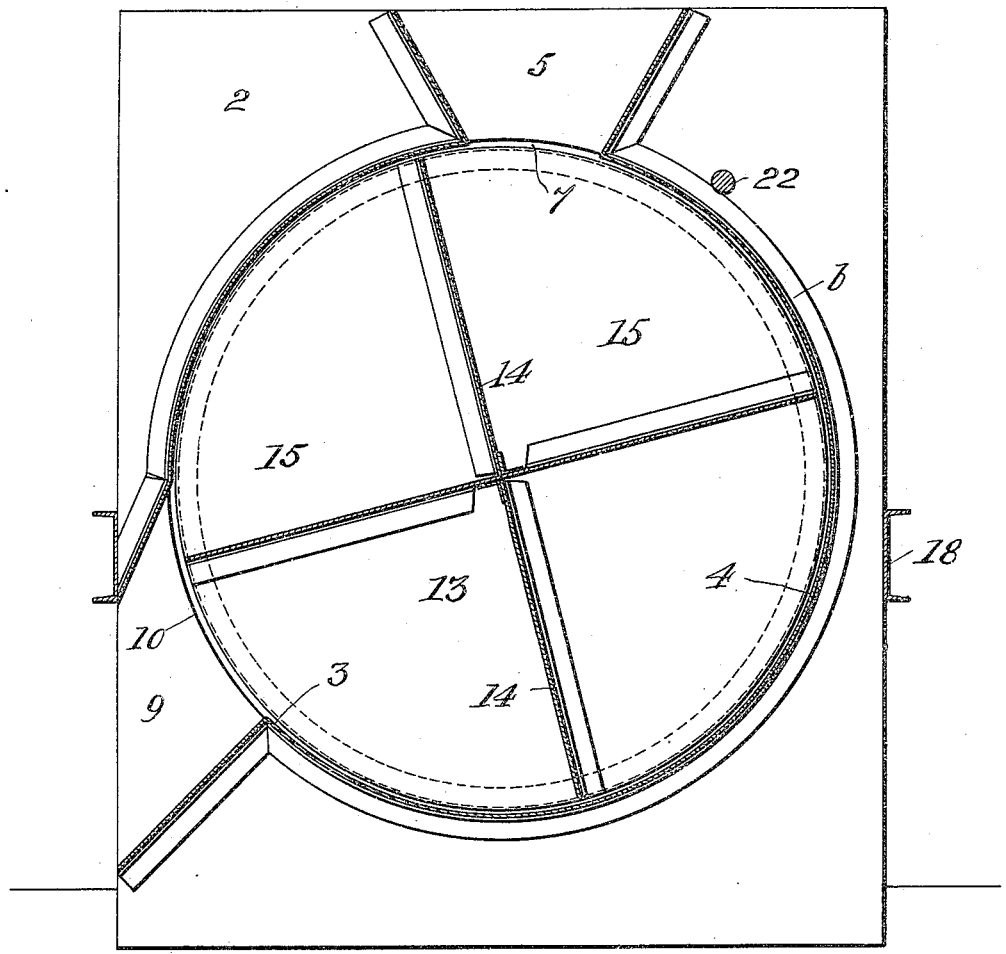

F. P. RENNEBURG.
APPARATUS FOR MEASURING FISH.
APPLICATION FILED JULY 15, 1909.
953,436.
Patented Mar. 29, 1910.
3 SHEETS—SHEET 3.
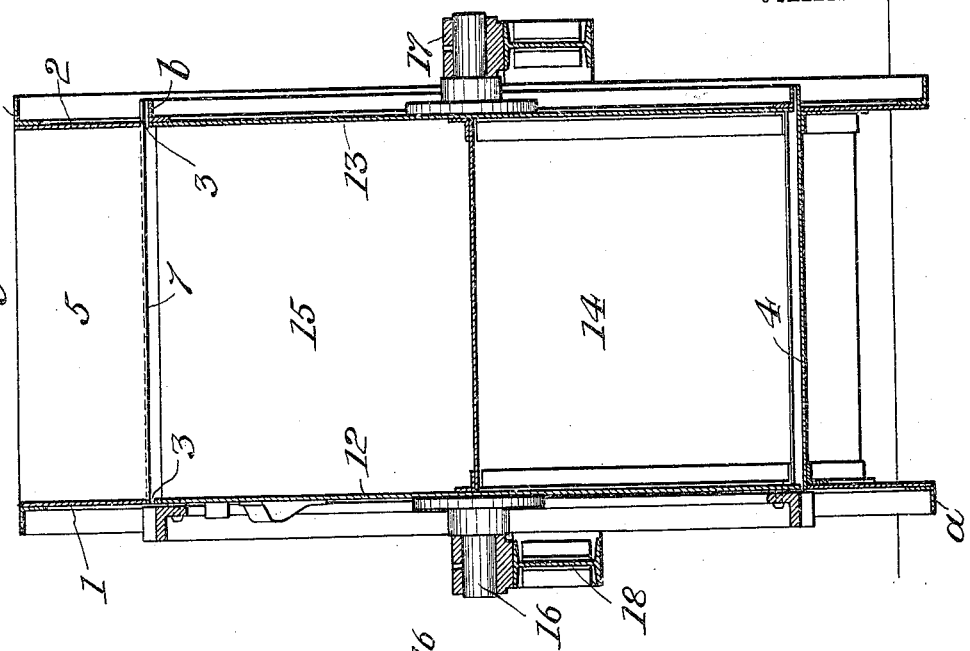
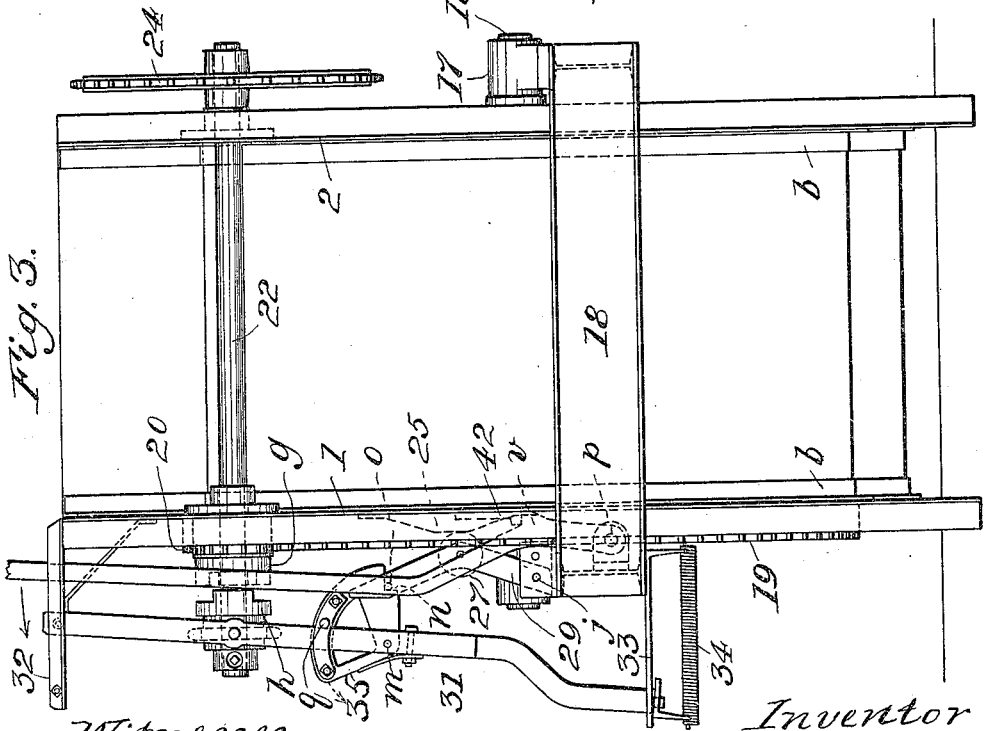
Witnesses:
Alberta Richards
Th. Mackenzie
Inventor
Frederick P. Renneburg,
by G. H. & W. T. Howard,
Atty.

UNITED STATES PATENT OFFICE.

FREDERICK PHILIP RENNEBURG, OF BALTIMORE, MARYLAND, ASSIGNOR TO EDWARD RENNEBURG & SONS COMPANY, A CORPORATION OF DELAWARE.

APPARATUS FOR MEASURING FISH.

953,436.     Specification of Letters Patent.     Patented Mar. 29, 1910.

Application filed July 15, 1909. Serial No. 507,670.

*To all whom it may concern:*

Be it known that I, FREDERICK PHILIP RENNEBURG, of the city of Baltimore and State of Maryland, have invented certain Improvements in Apparatus for Measuring Fish, of which the following is a specification.

Menhaden from which oil is expressed, and the residue used in the manufacture of a fertilizer, are usually sold to the factories by the thousand; and as the fish are of a practically uniform size, the number (1000) can be ascertained with a sufficient degree of accuracy by bulk measurement.

Such being the case, the present invention briefly stated, consists in incorporating in a measuring apparatus a rotary appliance which is divided into compartments having a cubical content which is equivalent to the bulk of one thousand menhaden. Into these compartments the fish are thrown, and the compartments are discharged of their contents during their rotation. Provision is also made for automatically stopping the apparatus if desired, during the filling of a compartment and while another is being discharged of its contents as will hereinafter fully appear.

In the further description of the said invention which follows, reference is made to the accompanying drawing, forming a part hereof, and in which,—

Figure 1 is an exterior side view of the apparatus. Fig. 2 is a side section of the same. Fig. 3 is an exterior rear end view of the apparatus, and Fig. 4 a central vertical section of Fig. 3.

Referring now to the drawings, 1 and 2 are rectangular plates strengthened at their edges by angle irons *a*, which also serve as supports for other parts of the apparatus. The plates 1 and 2 are each provided with a circular opening 3, and are connected by a stationary cylinder 4 which is open at its ends, the means of connection being angle iron rings *b* which surround the openings 3, as best shown in Figs. 2 and 4. The said plates are also connected at the top by angular plates forming a hopper 5 which leads to the feed opening 7 in the cylinder 4, and a similar construction is used to produce a chute 9 extending from the discharge opening 10 in the said cylinder, as shown particularly in Fig. 2.

12 and 13 are disks having a diameter which is slightly less than that of the cylinder 4 in which they are situated and adapted to rotate. The said disks are connected by radial plates 14 which terminate at the circumference of the disks and form the compartments 15 before referred to, (see Fig. 2) and the width of the radial plates is such that the disks are in alinement with the rectangular side plates 1 and 2 as shown in Fig. 4, and thereby produce flush inner vertical surfaces in the apparatus. In order that the disks carrying the radial plates may rotate, they are provided with trunnions 16 which rest in bearing boxes 17 secured to the frame-work 18 which surrounds the apparatus and is supported from the rectangular plates 1 and 2. The disk 12 is fitted with a toothed annulus 19, in mesh with a pinion 20 on a shaft 22 which is journaled in the plates 1 and 2, and driven by the sprocket wheel 24.

To admit of the rotation of the disks 12 and 13 with the radial plates 14, being automatically stopped as one compartment is brought into communication with the hopper 5 to be filled while another is brought to register with the discharge opening 10, the toothed pinion 20 is made loose on the shaft 22, and provided with a clutch member *g* adapted to engage with and receive rotation from a clutch member *h* which slides on a feather on the said shaft. The mechanism for throwing the clutch *h* in and out of gear with the corresponding member *g* on the face of the pinion 20, may be of any appropriate construction, but the devices which I use for the purpose consist as follows: On the outer surface of the disk 12 are secured four cam-faced projections 25 in substantially the positions with respect to the radial plates 14 shown in Fig. 1, and when in the rotation of the disks, one of the said projections reaches the position indicated by X in Fig. 1, it engages the roller 27 which is journaled in the branched bent lever 29 whose fulcrum is at *j*, and forces that device to the left in Fig. 3.

31 is a shifting lever connected to the clutch member *h* in a manner common in clutch shifters, and at its upper end pivoted to a bracket 32 extending from the vertical plate 1. The lower end of the lever 31 is placed within a slot in the guide plate 33, and below the guide plate is united by a coiled spring 34 the plate 1. The spring 34 serves to yieldingly hold the two clutch members *g* and *h* in engagement and thereby effect the operation of the apparatus.

35 is a spring-held sectoral tumbler pivoted at *m* to the clutch-shifting lever 31, having a lip *n* which through the medium of the coiled spring 34, is held in contact with a pin *o* projecting laterally from the bent lever 29, as shown in Fig. 3.

From the foregoing it will be understood that when a cam-faced projection 25 reaches the position X in Fig. 1, the clutch member *h* will be detached from the other member *g* on the pinion 20 as shown in Fig. 3, and rotation to the disks 12 and 13, and the radial plates 14 stopped, except that they will have further movement due to momentum of the parts. This movement however is prevented by means of devices hereinafter described.

In order that the machine after its stoppage may again be put in motion, and another quarter of rotation of the disks and radial plates performed, I pivot a hand lever 40 at *p* to some fixed part of the apparatus, and provide the sectoral tumbler 35 with a pin *q* against which the said lever strikes when the same is moved in the direction indicated by the curved arrow in Fig. 3. In this operation the spring-held tumbler is thrown back or in the direction indicated by the dotted curved arrow, and the lip *n* detached from the pin *o* on the bent lever 29; and there being now nothing to keep the clutch members apart, the member *h* is forced into engagement with the member *g* on the pinion 20, by the retractive action of the coiled spring 34; and upon the release of the hand lever it, together and the tumbler return to their original positions. The operation of the tumbler as described whereby the apparatus is stopped takes place upon the contact of each cam-faced projection 25 with the roller 27 on the bent lever 29.

I have hereinbefore alluded to devices to prevent motion of the moving parts of the apparatus due to momentum, after the separation of the clutch members. These consist of stops 42 fastened to the disk 12 (see Fig. 1) which have a proper position with respect to the cam-faced projection 25, and are in the path of a lug *v* on the hand lever 40 when the said lever is in its normal position or that shown in Fig. 3.

Supposing the compartment directly under the hopper 5 to be filled with fish, the apparatus is put in motion by pushing over the hand lever 40 to the left as described. The filled compartment now performs a quarter rotation and then stops, when the next compartment is filled and rotates like the first; and this intermittent motion continues, each compartment stopping to be filled, while a preceding compartment is discharging its contents into the chute *g*.

The intermittent motion of the machine if desired, may be changed to a continuous one by securing the hand lever in its outward position, when the tumbler will become inoperative as a means to effect the separation of the clutch members which remain interlocked.

I claim as my invention,—

In a fish measuring apparatus, a stationary cylinder open at its ends and provided with a feed hopper and a delivery chute, and a pair of disks situated within the cylinder and having radial plates which unite them and extend to the circumference of the disks whereby the space within the cylinder is divided into sectoral compartments of uniform content, combined with a toothed annulus adapted to have a rotary movement in common with the said disks, a driving shaft carrying a loose pinion which is in mesh with the said annulus, a clutch having a rotary movement in common with the driving shaft and adapted to be moved thereon so as to engage the said pinion, or to be separated therefrom, and devices to communicate movement from the one of the said disks to the clutch and thereby effect its disengagement as each sectoral compartment is in discharging position, substantially as specified.

FREDERICK PHILIP RENNEBURG.

Witnesses:
Jos. H. Thomas,
Wm. T. Howard.